Figure 1:
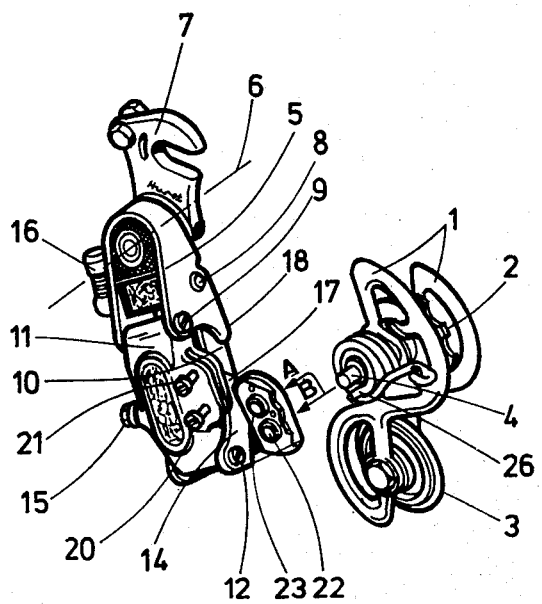

United States Patent [19]

Huret

[11] 4,274,828
[45] Jun. 23, 1981

[54] DERAILLEUR GEAR-CHANGE ASSEMBLY FOR A BICYCLE

[76] Inventor: Roger Huret, 60, avenue Félix Faure, Nanterre, France

[21] Appl. No.: 7,990

[22] Filed: Jan. 31, 1979

[30] Foreign Application Priority Data

Feb. 2, 1978 [FR] France .............................. 78 03271

[51] Int. Cl.³ ............................................ F16H 11/00
[52] U.S. Cl. .................................................... 474/82
[58] Field of Search ............. 74/217 B, 217 C, 217 S, 74/242, 242.11 B, 242.14 B, 242.15 B; 280/236, 238; 474/78–83

[56] References Cited

U.S. PATENT DOCUMENTS

| 648,690 | 5/1900 | Joaquin | 74/242 |
| 3,125,894 | 3/1964 | Juy | 280/238 X |
| 3,803,933 | 4/1974 | Huret et al. | 74/217 B |

FOREIGN PATENT DOCUMENTS

| 771557 | 7/1934 | France | 280/238 |
| 45176 | 4/1935 | France | 74/242.11 B |
| 995794 | 8/1951 | France | 74/217 B |
| 1041382 | 5/1953 | France | 74/217 B |
| 1200495 | 6/1959 | France | 74/217 B |
| 77578 | 10/1950 | Norway | 74/217 B |
| 382104 | 10/1932 | United Kingdom | 74/217 B |
| 600123 | 4/1948 | United Kingdom | 74/217 B |

*Primary Examiner*—Lawrence J. Staab
*Attorney, Agent, or Firm*—Kinzer, Plyer, Dorn & McEachran

[57] ABSTRACT

This invention relate a derailleur gear-change assembly for a bicycle, comprising a support cage carrying a chain guide wheel and a chain tensioning wheel, and a support means for the cage, the support means being provided with a means for producing translatory movement of the cage under the action of a cable and for passing the chain from one sprocket wheel of a freewheel of the bicycle to another sprocket wheel.

3 Claims, 3 Drawing Figures

DERAILLEUR GEAR-CHANGE ASSEMBLY FOR A BICYCLE

The invention concerns a derailleur gear-change assembly for a bicycle.

On bicycles as they are made at the present time, it would be desirable to be able to change the freewheel of the rear wheel of the bicycle, in order to change the gear diameter depending on whether the bicycle is used in hilly country or in flat country, or for training or for competition.

At the present time, when such an operation is to be carried out, it is necessary also to change the derailleur gear-change assembly, since the chain guide wheel of the derailleur gear-change assembly must be in a position as close as possible to the sprockets of the freewheel, in order for the gear-change assembly to operate under the best conditions.

Also, when the derailleur mechanism is changed, it is necessary to adjust the control cable and possibly to change the control cable, insofar as the cable is too short for the new derailleur gear-change assembly being used.

The aim of the present invention is in particular to overcome these disadvantages, and for this purpose the present invention concerns a derailleur gear-change assembly for a bicycle, comprising a support cage carrying a chain guide wheel and a chain tensioning wheel, and a support means for said cage, the support means being provided with a means for producing translatory movement of said cage by the action of a cable and for moving the chain from one sprocket wheel of a freewheel of the bicycle to another sprocket wheel, the derailleur gear-change assembly being characterised in that the cage is adjustably fixed on its support means.

In accordance with another feature of the invention, the support means of the cage comprises a deformable parallelogram assembly and adjustable fixing of the cage is achieved by means of a plurality of holes provided in the arm of the parallelogram assembly which receives the cage.

Figure 2:
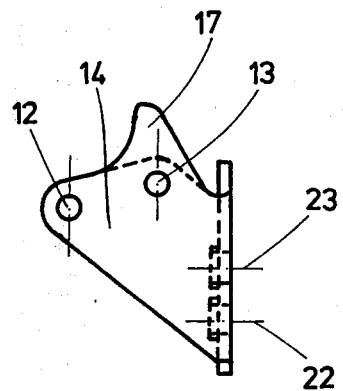
Figure 3:
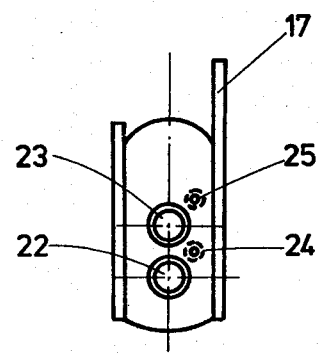

The invention is illustrated by way of non-limiting example in the accompanying drawing in which:

FIG. 1 is a perspective view of a derailleur gear-change assembly according to the invention, FIG. 2 is a side view of the arm of a parallelogram-type derailleur gear-change assembly according to the invention, for supporting the cage, and FIG. 3 is a view from the left in FIG. 2.

Consequently, the aim of the present invention is to permit rapid change of the freewheel of a bicycle with a derailleur gear-change assembly, without the need to change the derailleur gear-change assembly and possibly its control cable.

The invention provides for an adjustable derailleur gear-change assembly, said adjustment being simply provided between the support cage carrying the chain guide wheel and the chain tensioning wheel and the means which provide for translatory movement of the cage, so that there is no need to modify the length of the support means which connects the cage to the rear fork of the bicycle for adapting it to the fresh diameter of the freewheel.

This adjustment may be achieved by various means such as an elongate slot, a slide means, or a plurality of holes provided in the cage or the support means.

Thus, referring to FIG. 1, there is shown a parallelogram-type derailleur gear-change assembly according to the invention, comprising a cage 1 having two members which are disposed on respective sides of the chain guide wheel 2 and the chain tensioning wheel 3. The cage 1 is secured by a spindle 4 which is coaxial with the axis of the chain guide wheel 2, to the parallelogram structure of the derailleur gear-change assembly.

The parallelogram structure comprises a fixed arm 5 which is secured at an axis 6 to the lug 7 which is fitted to the rear fork of the bicycle around the hub spindle of the rear wheel.

Mounted on the arm 5 by way of pivot spindles 8 and 9 are two arms 10 and 11 which themselves receive the fourth arm 14 of the parallelogram, by way of spindles disposed at 12 and 13.

This parallelogram is actuated by means of a cable (not shown) fixed at 15 to the arm 11 and passing through a cable guide 16 on the arm 5.

Deformation of the parallelogram under the action of the cable provides for a translatory movement of the arm 14, such movement being limited by lugs 17 and 18 which are provided on the arms 14 and 15 and which, in the limit positions of the parallogram, bear against adjustable stops which are in the form of screws 20 and 21 provided on a lug formed on the arm 11 of the parallogram.

In accordance with the invention, the arm 14 of the parallelogram is itself provided with means which permit adjustment of the position of the cage 1. For this purpose, the arm 14 which is in the form of a U-shaped member comprises holes 22 and 23 in the base portion of the U-shape. The holes 22 and 23 are capable of receiving, in direction A–B, the spindle 4 which supports the cage.

It will thus be seen that the cage which is always maintained in the plane of the freewheel, may occupy a position which is adapted to the diameter of the sprocket wheels of the freewheel used on the bicycle, without there being any necessity to change the parallelogram structure and to modify the adjustment of the control cable.

By way of their axes (see FIG. 2), the holes 22 and 23 define a plane which is parallel to the plane of the deformable parallelogram, so that selecting one or other of the openings 22 and 23 for mounting the cage 1 keeps the chain guide wheel radially in the same angular position relative to the axis of the freewheel.

The holes 22 and 23 are preferably holes with turned-over edges so as to permit the spindle 4 to be efficiently gripped by means of a nut, while holes 24 and 25 of small diameter are moreover provided in the arm 14 in the same angular position relative to the holes 22 and 23 in order to permit the end of the chain tensioning spring to be positioned in one or other of the holes 24 and 25, depending on which of the holes 22 and 23 is used for receiving the spindle 4 and without any necessity to modify the adjustment of the end 26 of the spring.

I claim:

1. A derailleur gear-change assembly for a bicycle having a support cage itself carrying a chain-guide wheel and a chain tensioning wheel as well as a support means for said cage, said support means consisting of a deformable parallelogram for producing translatory movement of the cage under the action of a cable and for passing the chain from one sprocket wheel of a freewheel of the bicycle to another sprocket wheel, the improvement comprising a derailleur gear-change assembly in which several perforations are provided on the arm of the deformable parallelogram for the adjustable fixing of the cage.

2. A derailleur gear-change assembly according to claim 1 characterised in that the axes of the holes provided in the arm of the parallelogram which receives the cage define between them a plane parallel to the plane of the deformable parallelogram.

3. A derailleur according to claim 1, wherein the strap is fixed into one of the perforations by means of a coaxial axle to the chain-guide rollers.

* * * * *